United States Patent [19]
Edinger

[11] Patent Number: 5,511,499
[45] Date of Patent: Apr. 30, 1996

[54] SEEDING MACHINE AND METHOD

[76] Inventor: Otmar Edinger, Siebensterngasse 38/3, A-1070 Wien, Austria

[21] Appl. No.: 343,671

[22] Filed: Nov. 22, 1994

[30] Foreign Application Priority Data

Nov. 23, 1993 [AT] Austria ................................. 2379/93

[51] Int. Cl.⁶ .................................................. A01C 19/00
[52] U.S. Cl. ......................... 111/200; 111/900; 239/162; 172/102
[58] Field of Search ..................... 111/200, 120, 111/11, 61, 69, 157, 149, 900, 921; 172/110, 101, 102; 239/162, 160, 161, 166, 230

[56] References Cited

U.S. PATENT DOCUMENTS

| | | | |
|---|---|---|---|
| 2,461,617 | 2/1949 | Waters | 239/162 |
| 2,574,206 | 11/1951 | Browning | 239/162 |
| 3,291,453 | 12/1966 | Oosterling | 172/102 |
| 3,404,644 | 10/1968 | Vissers | 111/11 |
| 3,413,940 | 12/1968 | Vissers | 172/102 |
| 3,670,670 | 6/1972 | Vissers | 172/102 |

Primary Examiner—Randolph A. Reese
Assistant Examiner—Spencer Warnick
Attorney, Agent, or Firm—Herbert Dubno

[57] ABSTRACT

A planter or seeder is drawn rectilinearly over the field and has sowing blades like casters or tailwheels which are caused to swivel from side to side so that the rows defined by the sowing blades have an undulating or sinusoidal pattern.

9 Claims, 5 Drawing Sheets

SEEDING MACHINE AND METHOD

FIELD OF THE INVENTION

My present invention relates to a seeding machine, i.e. a seeder for sowing seed on an agricultural plot and to a method of operating such a machine or a method of sowing seed.

BACKGROUND OF THE INVENTION

Sowing machines for seeding an agricultural plot generally comprise a support which can be drawn across the ground, e.g. by a tractor, provided with a seed box, a multiplicity of tubes for distributing the seed from the seed box and sowing shares or blades which engage in the ground and thus furrow the latter at least slightly to allow the seed to drop into the furrow made by the respective seeder.

In general, the sowing blades are positioned so that as the support is displaced along a linear path, each of the blades forms a straight line furrow in which a row of seeds is disposed one behind the other linearly.

OBJECTS OF THE INVENTION

It is the principal object of the present invention to provide a sowing machine or seeder which is capable of increasing the planting density in terms of the number of plants per unit area over prior art planters.

Another object of the invention is to provide an improved method of distributing seed over an agricultural plant.

It is also an object of this invention to provide a planter, i.e. a seeder, capable of wide area distribution of seed.

SUMMARY OF THE INVENTION

These objects are attained, in accordance with the present invention by providing the sowing blades so that they can swivel from side to side while the sowing machine or seeder is drawn in a straight line path, e.g. by a tractor. As a consequence of this swivelling action, the seed is not deposited in straight line rows but rather in an undulating or wave-like pattern.

By comparison with planters of conventional design where the seed is deposited only in straight line rows, the seed with the apparatus of the invention can provide plants which are closer together and hence a more dense distribution of seed than an in-line planter. The invention utilizes the fact that for a given linear displacement of the planter, the sinusoidal pattern of seed distribution provides a longer seed deposition path than is the case with rectilinear seeders.

According to the invention, therefore, a planter, seeding machine or seeder can comprise:

- a support displaceable over ground to be seeded in a direction of advance of the seeder:
- a seed box on the support;
- a plurality of seed tubes on the support distributing seed from the seed box;
- a plurality of sowing blades engageable in the ground and each connected to one of the seed tubes for sowing seed distributed to the respective blade by the respective seed tube;
- means for pivotally mounting each of the sowing blades tailwheel fashion on the support for swiveling about a respective substantially vertical swivel axis; and
- means for imparting side to side movement to the axes transverse to the direction, whereby each of the sowing blades moves in an undulating pattern as the support is displaced over the ground in the direction.

The plants along the sinusoidal rows can have a greater spacing than plants along rectilinear rows although the overall plant density on the agricultural plot can be greater.

According to the invention, the sowing blades or sowing plow shares are swingable about at least one substantially vertical pivot axis with a caster-like or tailwheel-like swivelling pattern, on blade carriers which themselves are transversely movable, i.e. movable from side to side transversely to the direction of advance of the planter. I have found that with such a planter the waveshape of the seeding rows makes it possible to increase the amount of seed distributed by 20% per meter square of the agricultural plot.

For uniform distribution of the seed, the sowing blades are preferably provided with a uniform spacing from one another transversely to the direction of advance of the planter, preferably on traverses which can themselves by displaced longitudinally but perpendicular to the direction of displacement of the support.

Excellent results are obtained when two such traverses or sowing blade carriers are provided one behind another and these carriers are coupled together by two double arm levers whose lever arms of equal length, each of these coupling levers being journaled centrally on a respective pivot axis on the support of the machine. The coupling levers are driven in angular oscillation about their respective pivot axis.

For transport of the planter, contact of the sowing blades with the ground should be avoided and this can be achieved by providing the support so that it is swingable about an axis perpendicular to the axis of displacement of the support, thereby lifting the sowing blades from the ground. According to a further feature of the invention, the sowing blade carriers can extend in the direction of displacement of the support while the sowing blades are swivelable at ends of these carriers. To impart displacement to the carriers in a side-by-side relationship, the carriers may be pivotally connected to a common support beam transverse to the direction of advance of the sowing machine and each two neighboring carriers are coupled with a common drive for sinusoidally displacing them side to side but in opposite senses.

When the machine is operated so that there is a centrifugal casting of the seed as well as the undulating pattern of displacement of the blades, a particularly wide dissemination of the seed can be obtained and the broadcast distribution can uniformly cover a wide area of the agricultural plot. The method of the invention thus can comprise:

- substantially linearly displacing a seeder over ground to be seeded in a direction;
- engaging respective swivelable sowing blades on the seeder in the ground;
- feeding seed from a common seed box to the sowing blades; and
- imparting side to side displacement to swivel axes of each of the blades as the seeder in substantially linearly displaced over the ground, thereby moving each of the sowing blades in an undulating pattern and spreading seed in the pattern and adjacent the respective pattern from each blade as the support is displaced over the ground in the direction, thereby widely broadcasting seed on the ground.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
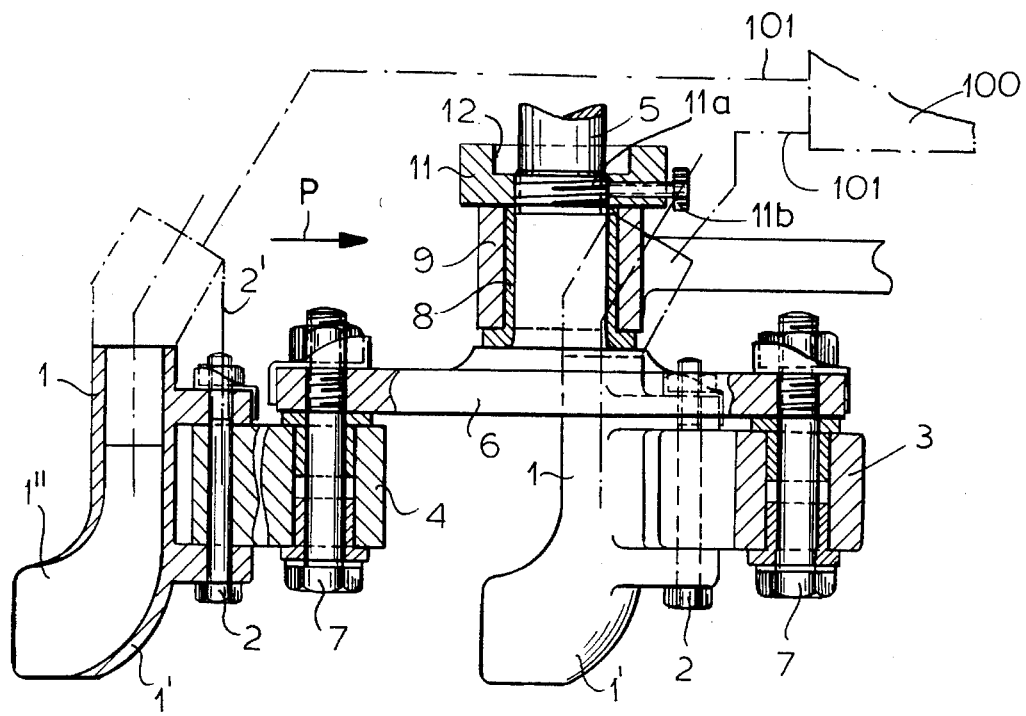
FIG. 1 is a side elevational view taken in cross section along the line I—I of FIG. 2 of a part of a seeder according to the invention showing the mounting of the sowing blades.
Figure 2:
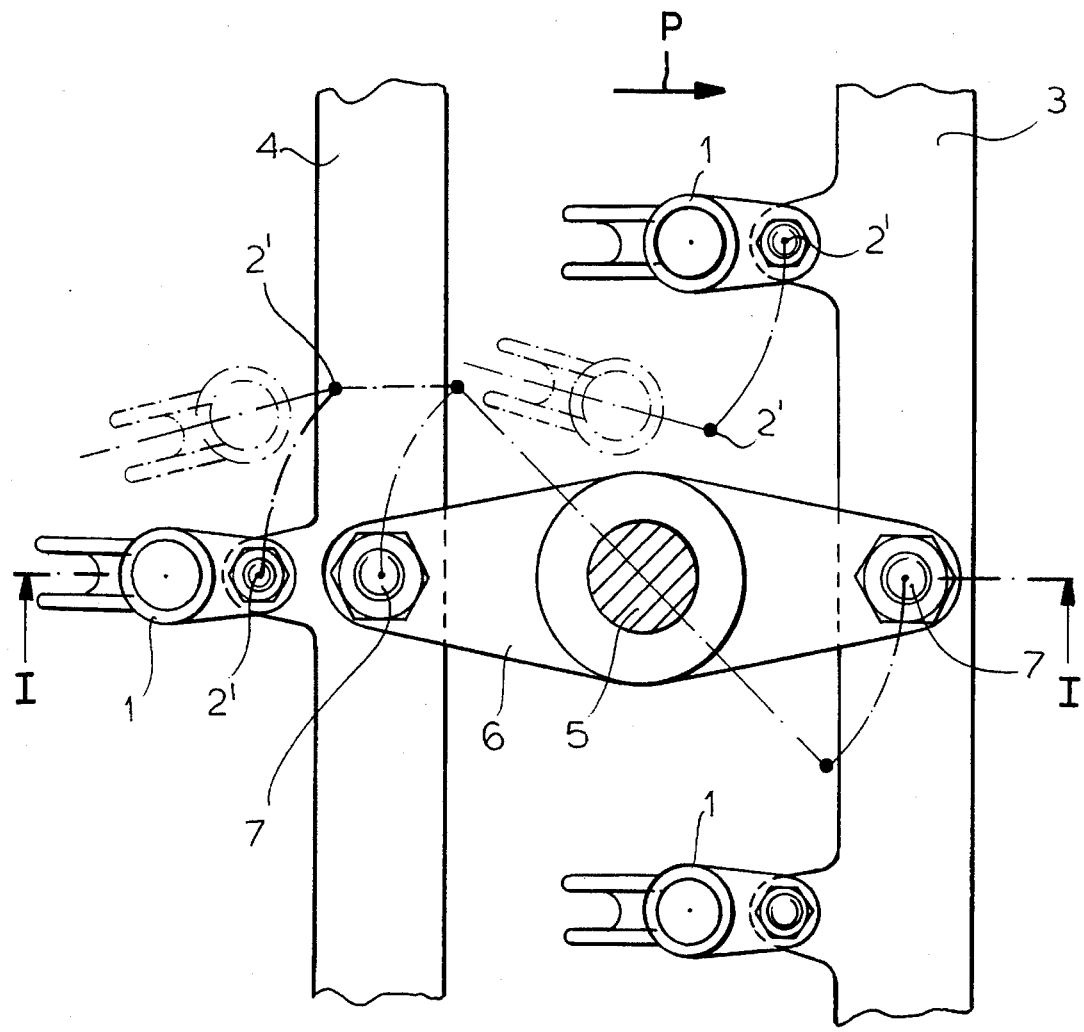
FIG. 2 is a plan view of the blade mounting portion of the seeder of FIG. 1.
Figure 2A:
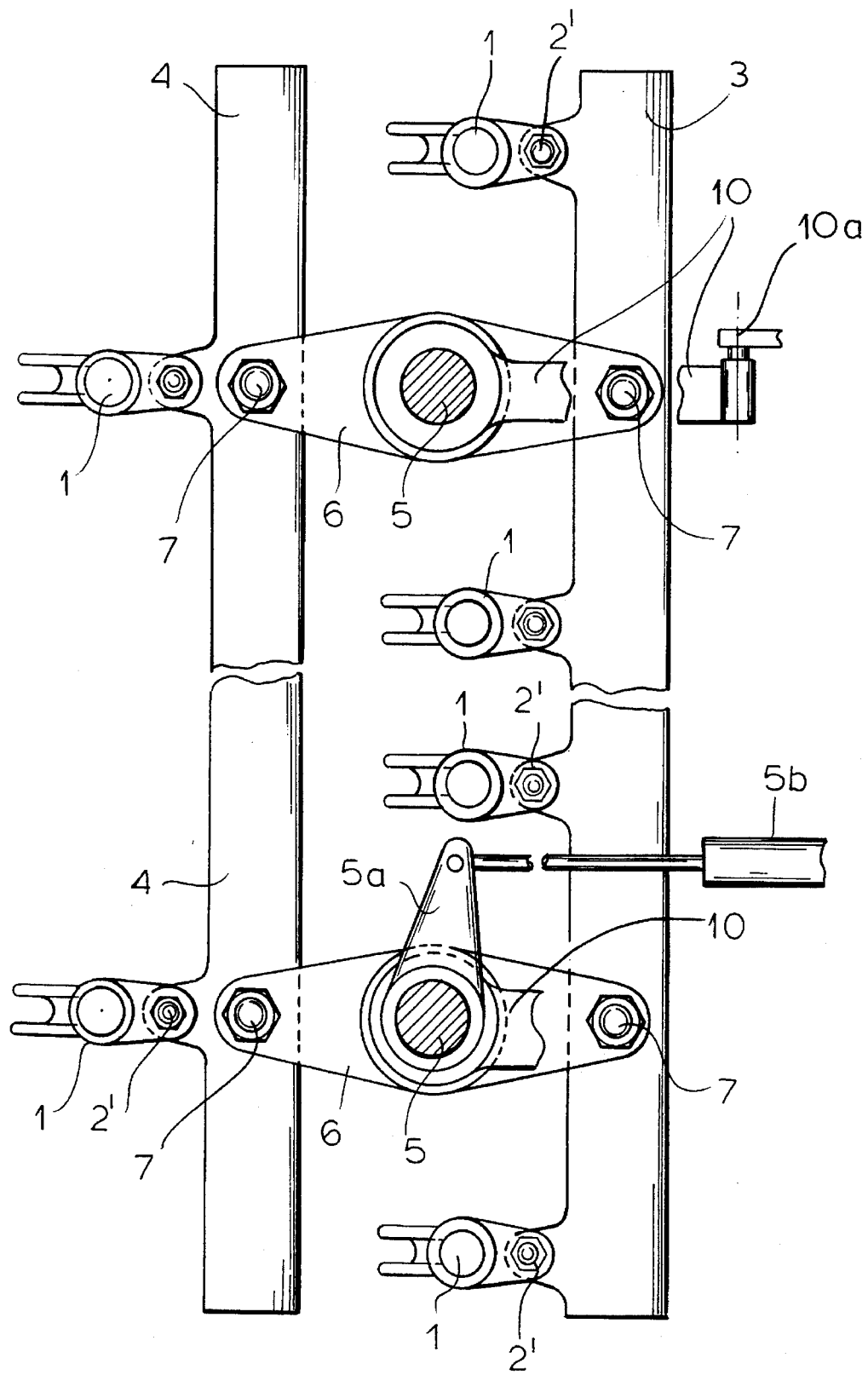
FIG. 2a is a view drawn to a similar scale but also corresponding to FIG. 2 and showing the parallelogrammatic linkage formed by the coupling levers and the sowing blade carriers.

As can be seen from FIGS. 1 and 2, sowing blades or shares 1 are downwardly mounted on sowing blade beams 3 and 4 by vertical pins 2 so as to be capable of swivelling from side to side like tailwheels of an aircraft or swivel casters.

The beams 3 and 4 are spaced apart in the direction P of displacement of the seeder for sowing seed. The sowing blade beams 3, 4 are, however, parallel to one another and each beam 3, 4 beam a plurality of identity constructed and equispaced sowing blades or shares 1. The shares 1 of the beam 3 are offset relative to the shares 1 of the beam 4 by half of the spacing between two shares 1 on the respective beams, an offset of half of the sowing blade or share pitch.

The sowing blade beams 3 and 4 are coupled by at least two double arm levers (see FIG. 2), each of which is rotatable about a vertical axis 5 (FIG. 2). The double arm levers 6 are pivotally connected to the beams 3 and 4 by pins Since the lever arms of the lever 6 are of equal length and the levers 6 are parallel to one another, two levers 6 and the beams 3 and 4 form a parallelogrammatic linkage which can be actuated to shift the beams 3 and 4 in opposite directions transverse to the direction of travel P of the apparatus. Each shaft 5 is rotatable in a bushing 8 of an eye 9 of a support 10 of the sowing machine. The support 10 is swingable about a horizontal axis 10a to raise the sowing blades 1 from the ground for transport of the seeder.

The shafts 5 and the parts 1–4 and 6 and 7 carried thereby are held by a ring 11 fixed against the eye 9 and connected by a screw thread 11a and a set screw 11b with the shaft 5. The means for driving the shafts 5 angularly can be a crank arrangement as represented at 5a.

The ring 11 can be formed with an annular groove 12 in which centering hoses of widths can be received for controlling the depth of penetration of the sowing blades 1 into the ground, the weights being annular and mounted on each shaft 5.

The lower portion 1' of each sowing blade 1 is, as has been illustrated, arcuate so that upon engagement in the ground, an upward force is generated as the apparatus is drawn over the ground. To maintain a certain depth of penetration, therefore, the sowing blades must be sufficiently weighted. The amount of weight is determined empirically since it depends upon the consistency of the soil.

Figure 5:
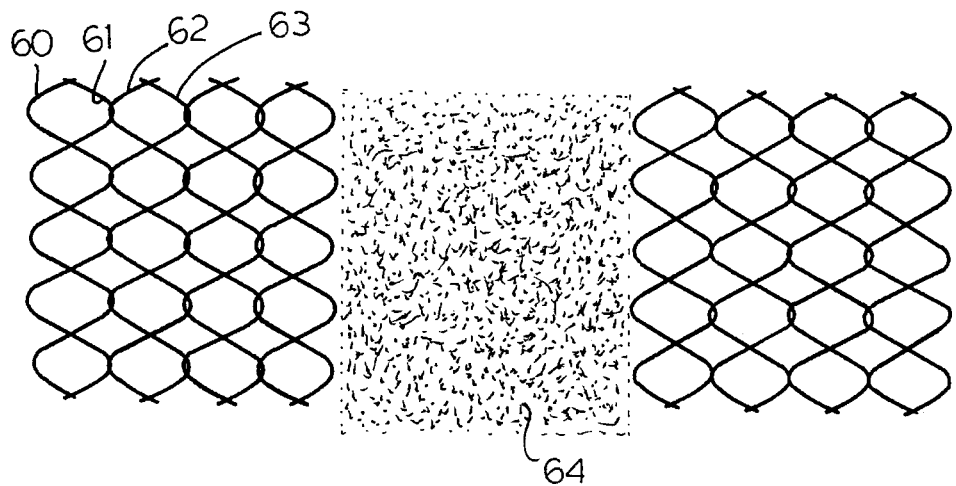
FIGS. 5–7 are views showing distribution of the seed for various patterns of the rows defined by the undulating sowing blades operations.

As the blades 1 are drawn in the direction P across the ground, the seed passes from the seed box 100 through the distribution tubes 101 to the passages 1' of the sowing blades as in conventional planters. Here, however, the blades 1, in addition to traveling in the direction of arrow P are swung from side to side transversely to the travel direction so that the seed is deposited in wave-like rows as will be described in connection with FIGS. 5–7.

The shafts 5 can be swung through about 90° in the clockwise sense and then in the counterclockwise sense by the crank drive so that the swivel axes 2 of the pins 2 are swung in circular arc segmental paths about the respective axis of the shaft 5 (see FIG. 2). As a result, the sowing blades 1 assume inclinations to the travel direction P and generate a sinusoidal distribution pattern on the ground. The angle of swing can be altered as desired. In the case illustrated, the crank drive 5a utilizes a pneumatic cylinder 5b. By selection of the lengths of the lever arms of the levers 6, the spacing between the sowing blades 1 on the beams 3 and 4, etc, the waveform of the respective rows can be altered. The lengths of the beams 3 and 4 can be selected as need arises say between 0.5 m and 3.5 m. Shorter beams adjust better to uneven ground and allow the stiffness of the beams 3 and 4 to be reduced.

Figure 3:
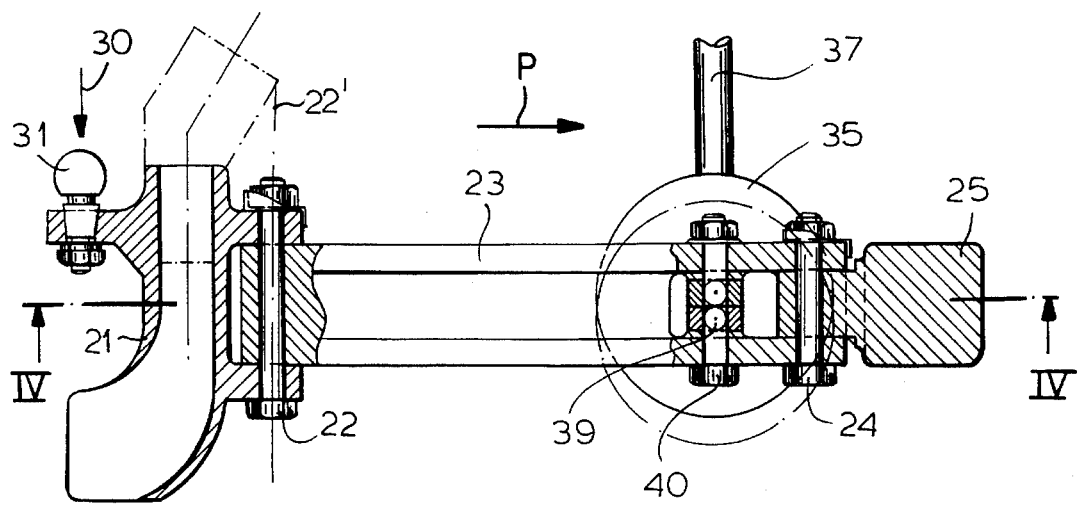
FIG. 3 is a side view in section along the line III—III of FIG. 4 of a part of seeder or planter with a different arrangement of the sowing blade mounting from that in FIGS. 1 and 2.
Figure 4:
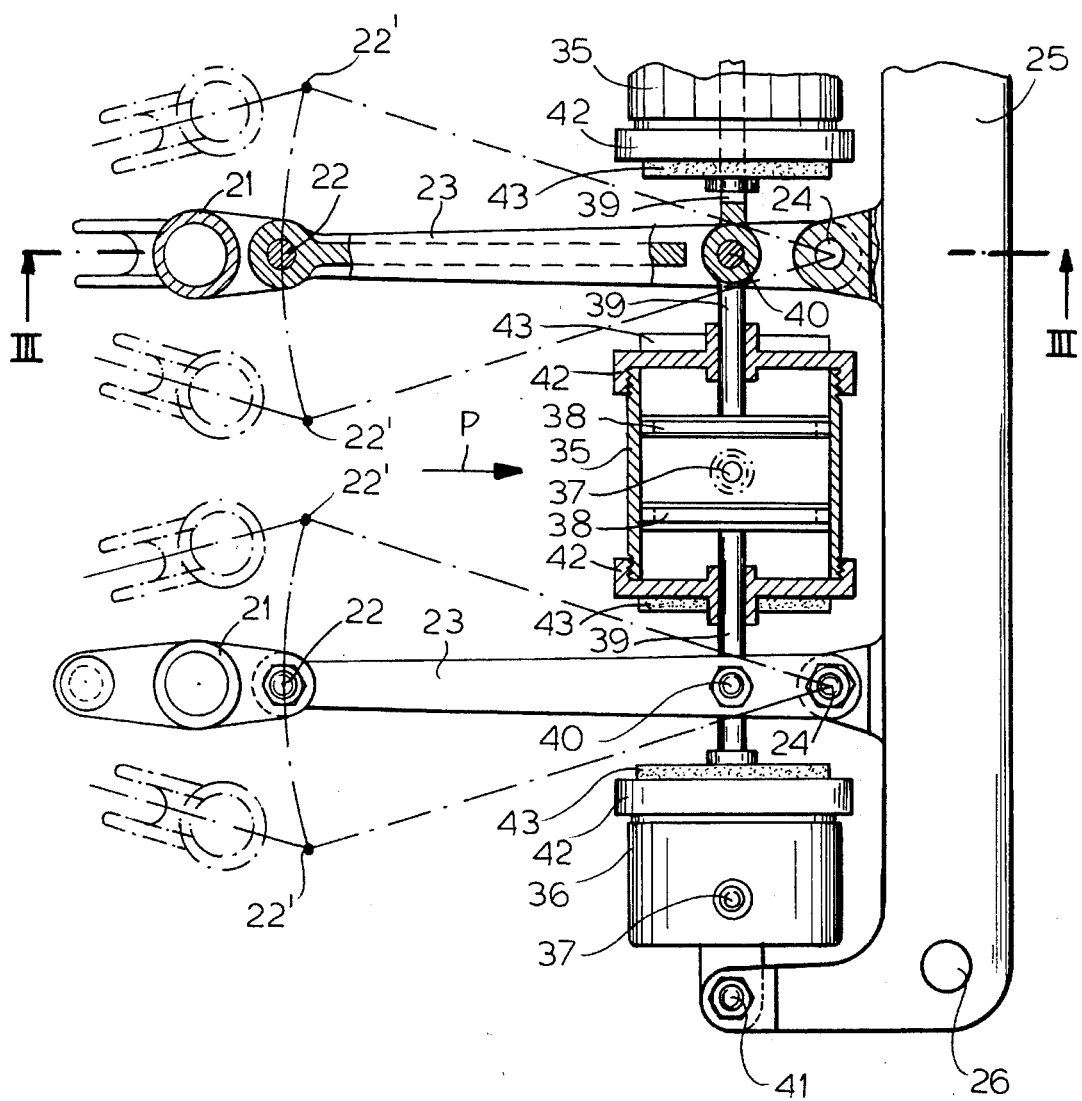
FIG. 4 is a plan view of the mounting region seen in FIG. 3.

In the modification of FIGS. 3 and 4, the sowing blades 21 are individually mounted at the ends of blade carriers 23 by means of swivel pins 22. The carriers 23 here extend generally in the direction of travel of the planter and each can be pivotally mounted by a pin 24 on a beam 25 common to all of the carriers. The length of the beam 25 can be chosen as well. For fastening the beam 25 on the hitch of the tractor and the mechanism for raising and lowering the beam 25, bores 26 can be provided in the beam which can receive appropriate bolts.

The carriers 23 are mounted on the beam 25 with axial play so that the sowing blades 21 can move in the vertical direction to an extent determined by this play and can better adjust to ground contours.

The sowing blades 21 can be weighted in the direction represented by the arrow 30 to allow the requisite penetration depth into the soil to be chosen. The weighting also limits excessively rapid lateral movements of the sowing blades. Instead of weights, a pneumatic cylinder can be provided for providing downward force and controlling the depth of penetration. The cylinder can act in the direction of arrow 30 on respective ball heads 31 of each sowing blade 21.

To induce the side to side movement of the swivel axes 22', the carriers 23 are connected by pneumatic cylinders 35 and at the ends of the beam 25 a further pneumatic cylinder 36 is provided to act upon the last carrier 23. In the cylinders between carriers 23 two pistons 38 are provided whereas only a single piston is provided in each of the end cylinders 36.

Figure 6:
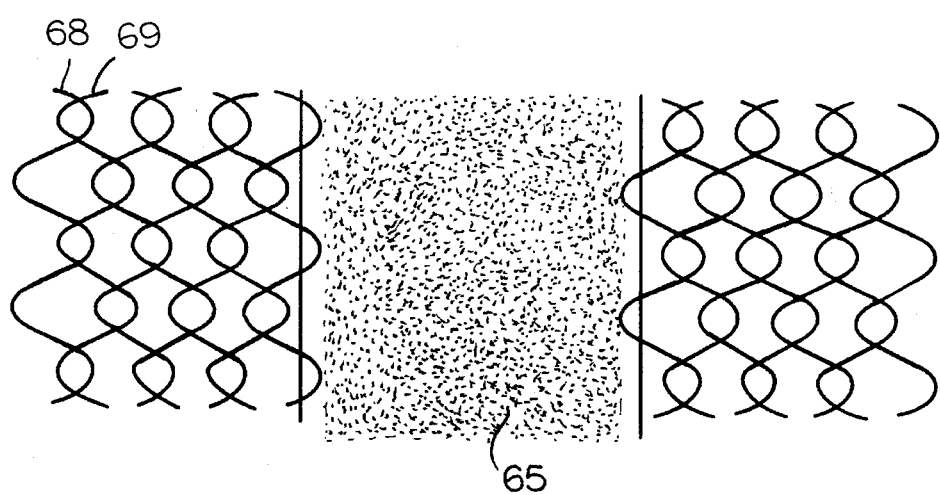
Figure 7:
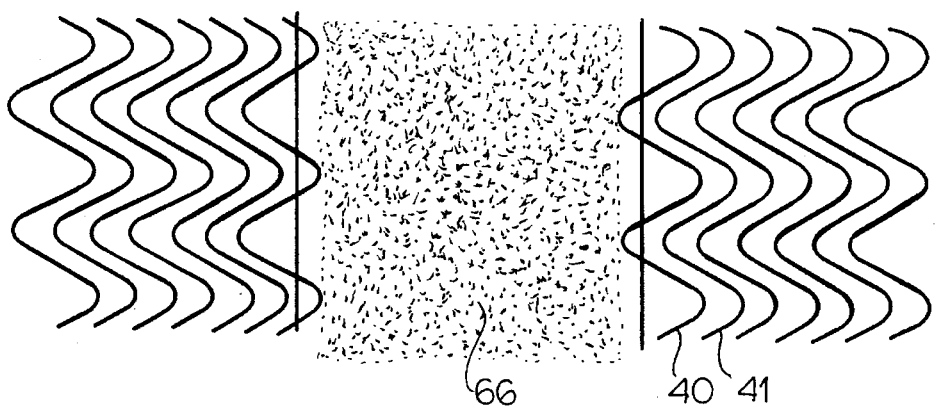

The piston rods 39 of the pistons 38 are pivotally connected to the carriers by pins 40 through an eye in each piston rod. Compressed air pipes 37 are connected to the cylinders 35 and 36 and open between the pistons 38 of the cylinder 35. In operation every second pipe 37 is pressurized while each nonpressurized pipe 37 is vented. The piston 36 at the end of the beam 25 is connected by a pivot 41 with the beam. The covers of the cylinders can be vented to the atmosphere ahead of each piston to allow displacement of the piston by compressed air. As a consequence, when each second cylinder 35 is pressurized, the neighboring carriers 23 are displaced in opposite senses and upon alternate venting and pressurization of the pistons, oscillating movement of the carriers 23 in the side to side displacement is established to cause the sowing blades to swivel from side to side as shown in dot-dash lines and describe the undulating pattern on the ground. As can be seen from FIG. 5, the row 60 generated by one sowing blade is opposite but of the same pitch and amplitude as the row 61 of another blade and these amplitudes are such that the two rows directly adjoin two other rows 62 and 63 to form a pattern across the field which, when the seed is scattered centrifugally from the blade results in a uniform broadcast distribution. Strips 64, 65 and 66 left unplanted. Other broadcast patterns can be obtained as shown in FIGS. 6 and 7. For example, the amplitudes of the rows 38 an 39 in FIG. 6 are such that the undulating patterns overlap whereas in FIG. 7, the sowing blades move in substantially parallel patterns 40 and 41 so that there is no such overlap.

I claim:

1. A seeder comprising:
   a support displaceable over ground to be seeded in a direction of advance of the seeder;
   a seed box on said support;
   a plurality of seed tubes on said support distributing seed from said seed box;
   a plurality of sowing blades engageable in said ground and each connected to one of said seed tubes for sowing seed distributed to the respective blade by the respective seed tube;
   means for pivotally mounting each of said sowing blades tailwheel fashion on said support for swiveling about a respective substantially vertical swivel axis; and
   means for imparting side to side movement to said axes transverse to said direction, whereby each of said sowing blades moves in an undulating pattern as said support is displaced over said ground in said direction.

2. The seeder defined in claim 1 wherein said support is provided with a plurality of sowing-blade beams extending transversely to said direction and spaced apart in said direction, a plurality of said sowing blades being provided on each of said beams with equal spacings from one another.

3. The seeder defined in claim 2 wherein a pair of mutually parallel sowing-blade beams spaced apart in said direction are coupled together by two mutually parallel coupling levers swingable about respective lever axes on said support, said coupling levers having equal-length arms pivotally connected to the beams of said pair, said means for imparting side to side movement including a drive for angularly oscillating said coupling levers.

4. The seeder defined in claim 3, further comprising means for mounting said support for pivotal movement about a lifting axis perpendicular to said direction for raising said sowing blades from the ground.

5. The seeder defined in claim 1 wherein said support is provided with a plurality of sowing-blade carriers extending generally in said direction and spaced apart transversely to said direction, a swivel axis of a respective one of said sowing blades being provided on a free end of each of said carriers.

6. The seeder defined in claim 5 wherein said support includes a beam extending transversely to said direction, said carriers are pivotally connected to said beam, and said means for imparting side to side movement includes a common drive for two of said carriers displacing same transversely to said direction in opposite senses.

7. A method of operating a seeder comprised of a support displaceable over ground to be seeded in a direction of advance of the seeder, a seed box on said support, a plurality of seed tubes on said support distributing seed from said seed box, a plurality of sowing blades engageable in said ground and each connected to one of said seed tubes for sowing seed distributed to the respective blade by the respective seed tube, means for pivotally mounting each of said sowing blades tailwheel fashion on said support for swiveling about a respective substantially vertical swivel axis, and means for imparting side to side movement to said axes transverse to said direction, said method comprising the steps of:
   (a) displacing said support substantially linearly in said direction; and
   (b) while said support is displaced substantially linearly in said direction imparting said side to side movement to said swivel axes transverse to said direction so that each of said sowing blades is moved in an undulating pattern and seed is delivered in said pattern and adjacent the respective pattern from each blade as said support is displaced over said ground in said direction.

8. The method defined in claim 7 wherein said blades are provided in two groups, one of said groups being swiveled in a sense opposite to a swiveling sense of the other group to substantially equalize forces applied to said support by swiveling action of said blades.

9. A method of sowing seed, comprising the steps of:
   substantially linearly displacing a seeder over ground to be seeded in a direction;
   engaging respective swivelable sowing blades on said seeder in the ground;
   feeding seed from a common seed box to said sowing blades; and
   imparting side to side displacement to swivel axes of each of said blades as said seeder in substantially linearly displaced over said ground, thereby moving each of said sowing blades in an undulating pattern and delivering seed in said pattern and adjacent the respective pattern from each blade as said support is displaced over said ground in said direction.

* * * * *